United States Patent
Larsson et al.

(10) Patent No.: US 10,071,632 B2
(45) Date of Patent: Sep. 11, 2018

(54) ELECTRICAL SYSTEM FOR A VEHICLE WITH START/STOP

(75) Inventors: Torbjoern Larsson, Goeteborg (SE);
Patrik Larsson, Landvetter (SE);
Daniel Midholm, Goeteborg (SE);
Fredrik Ulmhage, Goeteborg (SE)

(73) Assignee: Volvo Car Corporation, Gothenburg (SE)

( * ) Notice: Subject to any disclaimer, the term of this patent is extended or adjusted under 35 U.S.C. 154(b) by 565 days.

(21) Appl. No.: 13/593,124

(22) Filed: Aug. 23, 2012

(65) Prior Publication Data
US 2013/0229049 A1 Sep. 5, 2013

(30) Foreign Application Priority Data
Aug. 25, 2011 (EP) ..................................... 11178816

(51) Int. Cl.
*B60L 1/00* (2006.01)
*F02N 11/08* (2006.01)
*H02J 7/14* (2006.01)

(52) U.S. Cl.
CPC ............ *B60L 1/00* (2013.01); *F02N 11/0814* (2013.01); *H02J 7/1423* (2013.01); *F02N 11/0866* (2013.01); *Y02T 10/48* (2013.01); *Y02T 10/7005* (2013.01)

(58) Field of Classification Search
CPC ....................................................... B60L 1/00
USPC ................................................ 307/10.1, 9.1
See application file for complete search history.

(56) References Cited

U.S. PATENT DOCUMENTS

| | | | | |
|---|---|---|---|---|
| 3,657,720 A | * | 4/1972 | Avdenko ................ | B60K 28/10 290/37 A |
| 5,455,463 A | * | 10/1995 | Langnickel ........... | H02J 7/1423 307/10.1 |
| 6,068,504 A | | 5/2000 | Gardner et al. | |
| 6,313,546 B1 | * | 11/2001 | Nishimura ............ | H02J 7/0054 307/125 |

(Continued)

FOREIGN PATENT DOCUMENTS

CN 1247396 A 3/2006
DE 3434532 C1 2/1986
(Continued)

OTHER PUBLICATIONS

European Search Report for Application No. 11178816.2 dated Feb. 3, 2012.
(Continued)

*Primary Examiner* — Daniel Kessie
(74) *Attorney, Agent, or Firm* — Brooks Kushman P.C.

(57) ABSTRACT

An electrical system for a vehicle having an internal combustion engine provided with a start/stop system includes a primary battery connectible to an engine starter motor, an alternator and an electrical load in parallel with one another and selectively connectible in parallel with the primary battery via a first switch, and a third source of electrical energy selectively connectible in parallel with the alternator via a second switch. A DC/DC converter may be arranged in parallel with the alternator for selectively charging the third source of electrical energy via the second switch. A secondary battery may be arranged in parallel with the alternator.

11 Claims, 2 Drawing Sheets

(56) References Cited

U.S. PATENT DOCUMENTS

| | | | | |
|---|---|---|---|---|
| 6,466,024 | B1 * | 10/2002 | Rogers | B60L 11/1861 |
| | | | | 324/427 |
| 7,042,115 | B2 | 5/2006 | Mizutani et al. | |
| 7,336,002 | B2 * | 2/2008 | Kato | F02N 11/0866 |
| | | | | 307/10.6 |
| 7,806,095 | B2 * | 10/2010 | Cook | F02N 11/0866 |
| | | | | 123/179.3 |
| 8,519,563 | B2 * | 8/2013 | Lindstrom | F02N 11/0866 |
| | | | | 307/10.6 |
| 8,569,903 | B2 * | 10/2013 | Gibson | B60L 1/003 |
| | | | | 290/36 R |
| 2011/0001352 | A1 * | 1/2011 | Tamura | B60R 16/033 |
| | | | | 307/9.1 |
| 2013/0026823 | A1 * | 1/2013 | Fetzer | B60L 11/1851 |
| | | | | 307/9.1 |

FOREIGN PATENT DOCUMENTS

| | | | |
|---|---|---|---|
| DE | 10100889 A1 | 7/2002 | |
| DE | 10248658 A1 | 5/2004 | |
| DE | 102007029479 A1 | 1/2009 | |
| DE | 10 2007 029 479 * | 8/2009 | ............ F02N 11/08 |
| EP | 2138712 A1 | 12/2009 | |

OTHER PUBLICATIONS

Chinese Patent Office, First Search Report for corresponding Chinese Patent Application No. 2012102586422, dated Aug. 25, 2015, one page.

Chinese Patent Office, First Office Action for corresponding Chinese Patent Application No. 2012102586422, dated Sep. 2, 2015, (both English translation and original) 16 pages total.

Chinese Patent Office, Supplemental Search Report for corresponding Chinese Patent Application No. 2012102586422, dated Apr. 8, 2016, one page.

Chinese Patent Office, Second Office Action for corresponding Chinese Patent Application No. 2012102586422, dated Apr. 18, 2016, (both English translation and original) 16 pages total.

* cited by examiner

ELECTRICAL SYSTEM FOR A VEHICLE WITH START/STOP

CROSS-REFERENCE TO RELATED APPLICATIONS

This application claims foreign priority benefits under 35 U.S.C. § 119(a)-(d) to EP 11178816.2, filed Aug. 25, 2011, the disclosure of which is hereby incorporated by reference in its entirety.

TECHNICAL FIELD

The invention relates to motor vehicles having internal combustion engines with start/stop systems, and to an electrical system for such a vehicle.

BACKGROUND

So called start/stop systems are becoming increasingly common in vehicles having internal combustion engines. These systems have a proven ability to provide fuel savings, especially during city driving. This is due to a shutoff of the internal combustion engine when not required to propel the vehicle and a restart thereof once required again.

However, a limitation of some start/stop systems is that the battery life for traditional lead acid batteries may be significantly reduced. Furthermore, traditional lead acid batteries may need to be sized up significantly in order to handle the increased energy throughput from start/stop, in order to be able to fulfill the required battery life.

To mitigate this limitation, some known start/stop solutions incorporate one large main battery, such as a conventional acid-lead battery, and one smaller size support battery. The support battery in such a known arrangement is arranged to supply the electrical system of the vehicle during warm-starts of the engine. A warm-start is the restarting of the engine that occurs after a relatively brief shut-down period, as during normal start/stop operation of the vehicle while driving.

However, such a known arrangement may suffer from some limitations in the case of an increased number of start/stop events, higher timing demands and also increased current consumption by various vehicle systems.

SUMMARY

In a disclosed embodiment, an electrical system for a vehicle having an internal combustion engine provided with a start/stop system comprises a primary battery connectible to an engine starter motor, an alternator and an electrical load in parallel with one another and selectively connectible in parallel with the primary battery via a first switch, and a third source of electrical energy selectively connectible in parallel with the alternator via a second switch.

In another embodiment, the electrical system further comprises a DC/DC converter in parallel with the alternator and arranged for selectively charging the third source of electrical energy via the second switch.

In another embodiment, the electrical system further comprises a secondary battery in parallel with the alternator.

In another embodiment, a method of operating a motor vehicle having an internal combustion engine operable in a start/stop mode is described. The vehicle has an electrical system including a primary battery selectively connectible to a starter motor for the internal combustion engine via a starter solenoid, an alternator and additional vehicle electrical loads arranged in parallel with each other and selectively connectible in parallel with the primary battery via a first switch, and a third source of electrical energy selectively connectible in parallel with the alternator via a second switch. The method of operation comprises, when the engine is stopped during a start/stop event, opening the starter solenoid, closing the first switch, and closing the second switch. The method of operation further comprises, during warm cranking to end a start/stop event, closing the starter solenoid, opening the first switch, and closing the second switch. The method of operation further comprises, during regenerative braking, opening the starter solenoid, closing the first switch, and closing the second switch.

BRIEF DESCRIPTION OF THE DRAWINGS

Embodiments of the present invention will now be described by way of example only with reference to the accompanying drawings in which.

DETAILED DESCRIPTION

As required, detailed embodiments of the present invention are disclosed herein; however, it is to be understood that the disclosed embodiments are merely exemplary of the invention that may be embodied in various and alternative forms. The Figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
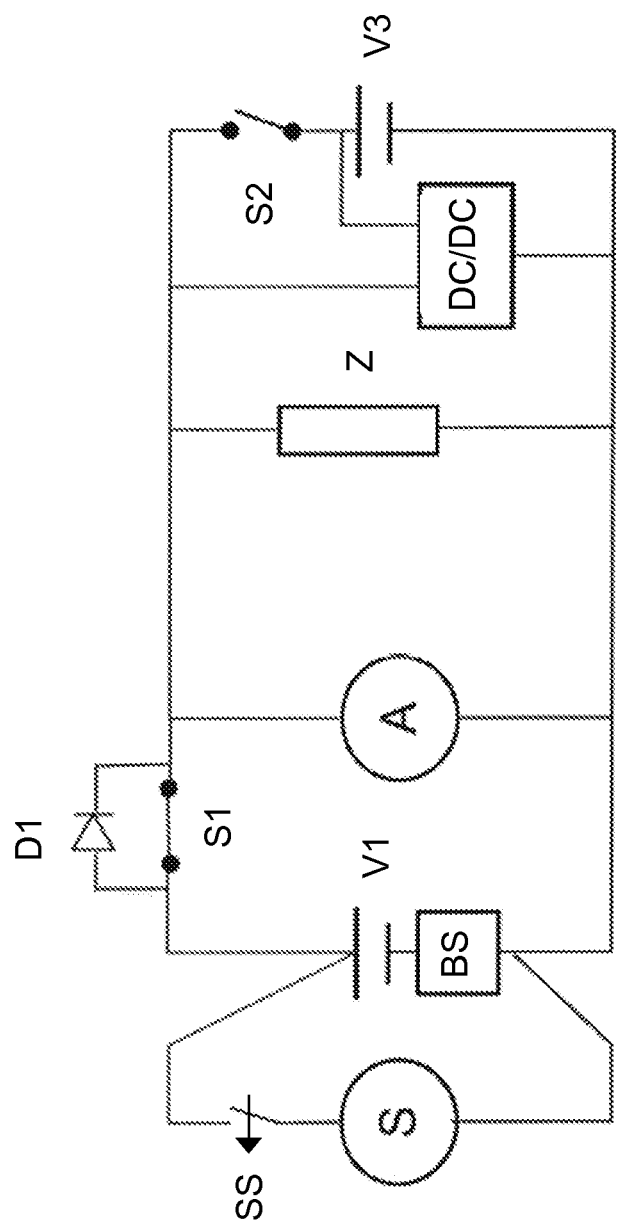
FIG. 1 is a schematic circuit diagram of a first embodiment of a vehicle electrical system.

FIG. 1 schematically depicts an electrical system of a vehicle having an internal combustion engine provided with a start/stop system. The electrical system comprises a primary battery V1 which is selectively connectible to a starter motor S for the engine via a starter solenoid SS, an alternator A, and additional vehicle electrical loads Z arranged in parallel with each other and selectively connectible in parallel with the primary battery V1 via a first switch S1. A battery sensor module BS is shown in series with the primary battery V1 and operates in a known manner to monitor performance characteristics of the battery.

According to the arrangement of FIG. 1, in parallel with the alternator A is further arranged a DC/DC converter, which DC/DC converter is arranged for selectively charging a third source of electrical energy V3. The third source of electrical energy V3 is selectively connectible in parallel with the alternator A via a second switch S2.

The provision of the DC/DC converter in parallel with the alternator ensures charging of the third source of electrical energy whereby the power of the charging DC/DC may be low since the main charging for the cycling battery comes from the alternator A.

The third source of electrical energy V3 may advantageously be a super capacitor or a lithium-ion battery. A super capacitor or lithium-ion battery provides rechargeable sources of electrical energy particularly suited for high energy throughput, and thus significantly reduce the energy throughput on a primary battery, such as a lead acid battery. This is also beneficial for the life expectancy of the primary battery.

If the third source of electrical energy V3 is a Lithium-ion battery with suitable voltage characteristics and low internal resistance, the DC/DC converter may be removed (not shown). This means that the charging of the third source of electrical energy V3 is done by the alternator A only.

Figure 2:
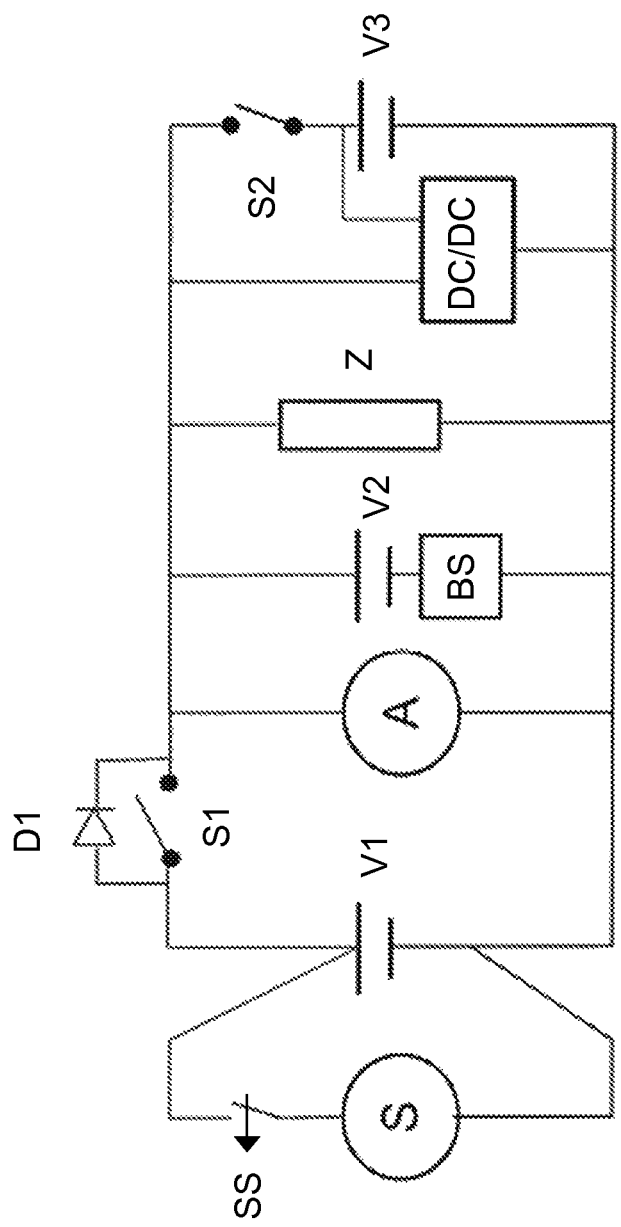
FIG. 2 is a schematic circuit diagram illustrating an alternative embodiment of a vehicle electrical system.

In a further embodiment, as illustrated in FIG. 2, a secondary battery V2 is arranged in parallel with the alternator A. The secondary battery arranged in parallel with the alternator provides redundancy for the electrical loads of the vehicles if, for example, an error occurs in the circuit comprising the third source of electrical energy. A battery sensor module BS is shown in series with the secondary battery V2 and operates in a known manner to monitor performance characteristics of the battery Thus, the above described embodiments relate to significantly reducing the energy throughput on a primary battery V1, such as a lead acid battery, of a vehicle having an internal combustion engine provided with a start/stop system. As described above this is achieved through using a third source of electrical energy V3, such as a cycling battery, e.g. a Li-ion or a NiMh battery, in parallel with the primary battery V1. The third source of electrical energy V3 is used to supply electrical loads Z of the vehicle when the alternator A of the vehicle is shut down. The third source of electrical energy V3 is charged by the alternator A with energy recovered during deceleration (regenerative braking) or via a small charging device, such as the DC/DC converter. The third source of electrical energy V3 is connected to the electrical system by second switch S2 which may, for example, be a relay or a MOSFET switch that also enables control of the charge and discharge of energy.

Cycling batteries, such as Li-ion, NiMh batteries or others, have much higher capability to handle energy throughput than traditional lead acid batteries. The aim hereof is thus to significantly reduce the energy throughput on the primary battery V1 by using in parallel therewith a third source of electrical energy V3, which is a cycling battery, which is used to supply electrical loads Z of the vehicle when the alternator A is shut down.

The third source of electrical energy V3 may be charged by the alternator A during vehicle retardation (regenerative braking) when the alternator voltage is increased. A high-power charging device, DC/DC or similar, would be used to control the charging of the third source of electrical energy V3.

The power of the charging DC/DC converter may be significantly reduced since the main charging for the third source of electrical energy V3 comes from the alternator A. As mentioned earlier the DC/DC converter may be removed (not shown), if for example, the third source of electrical energy V3 is a Li-Ion chemistry with suitable voltage characteristics and low internal resistance.

In accordance with the FIG. 2 embodiment, when the alternator A is shut down during combustion engine standby (stop phase in start/stop applications at standstill or in motion) the third source of electrical energy V3 is connected by second switch S2 in parallel with the secondary battery V2, which will perform the role of a consumption battery, and will thus supply the electrical system with current. This may be achieved through choosing a third source of electrical energy V3 with a higher open circuit voltage than the secondary battery V2.

Furthermore, the weight of the electrical power supply of the vehicle may be reduced, as compared to prior art solutions, since the secondary battery V2 may be reduced in size. Also, the redundancy feedings for loads in the electrical system will be significantly improved.

The arrangement will also enable engine and alternator A to be shut down during driving at speed.

The same arrangement may be used in trucks and buses. The arrangement may be scaled through adding cells to the cycling battery to handle 24V, 48V or any higher voltage.

It should be noted that both the first switch S1 and the second switch S2 as well as the redundancy diode D1 arranged in parallel with the first switch S1 are symbolic to illustrate the functionality. In a possible implementation of the proposed arrangements a software controlled MOSFET switch may be used for one or both of the first switch S1 and the second switch S2.

The present application also provides a method for improving the performance of an electrical system of a vehicle having an internal combustion engine provided with a start/stop system. The electrical system further comprises a primary battery V1 which is selectively connectible to a starter motor S for the internal combustion engine via a starter solenoid SS. An alternator A and additional vehicle electrical loads Z are arranged in parallel with each other and selectively connectible in parallel with the primary battery V1 via a first switch S1. The method comprises the steps of: arranging in parallel with the alternator A a DC/DC converter; and arranging said DC/DC converter for selectively charging a third source of electrical energy V3, which third source of electrical energy V3 is selectively connectible in parallel with the alternator A via a second switch S2.

In one embodiment of the method it comprises the further step of arranging as the third source of electrical energy V3 a super capacitor.

In an alternative embodiment of the method it comprises the further step of arranging as the third source of electrical energy V3 a lithium-ion battery.

In a yet further embodiment of the method it comprises the further step of arranging a secondary battery V2 in parallel with the alternator A.

In the following will be described some use cases illustrating use of the arrangement in accordance with the FIG. 1 embodiment.

In a first use case it is assumed that the vehicle is parked. The primary battery V1 will supply electrical loads Z of the vehicle. The third source of electrical energy V3, or cycling battery, is not used and both the first switch S1 and the second switch S2 are closed.

In a second use case it is assumed that the vehicle is used in an accessory mode, where the combustion engine is not running. The primary battery V1 will supply electrical loads Z of the vehicle. The third source of electrical energy V3, or cycling battery, is not used and the first switch S1 is closed while the second switch S2 is open.

In a third use case it is assumed that the vehicle is in use during combustion engine cranking. The primary battery V1 will supply electrical loads Z of the vehicle and the starter S, or alternatively only the starter S. The third source of electrical energy V3, or cycling battery, is not used, or alternatively used to supply electrical loads Z of the vehicle. The first S1 and second S2 switches are open or closed respectively, depending on the chosen solution.

In a fourth use case it is assumed that the vehicle is in use in a driving mode with the combustion engine running With "driving mode" is to be understood as a mode including the vehicle being driven at speed. The primary battery V1 will supply electrical loads Z of the vehicle. The third source of electrical energy V3, or cycling battery, is being charged by the alternator A or the DC/DC converter, and further functions as redundancy supply for electrical loads Z of the vehicle and provide low voltage protection at high transient current consumption. The first switch S1 will be closed and the second switch S2 will be closed during vehicle retardation in order to charge free energy into the third source of electrical energy V3 when the alternator voltage is increased or at transients as support for electrical loads Z of the vehicle.

In a fifth use case it is assumed that the vehicle is in use in a driving mode with the combustion engine in stopped during a start/stop event. The primary battery V1 will provide redundancy supply for electrical loads Z of the vehicle. The third source of electrical energy V3, or cycling battery, will provide primary supply for electrical loads Z of the vehicle, due to the fact that it may have a higher open circuit voltage than the primary battery, especially when the primary battery V1 is a lead-acid battery. Both the first switch S1 and the second switch S2 are closed.

In a sixth use case it is assumed that the vehicle is in use in a driving mode with the combustion engine undergoing engine cranking for warm start. The started solenoid SS is closed so that primary battery V1 provides power for the starter motor for engine cranking. The third source of electrical energy V3, or cycling battery, will provide supply for electrical loads Z of the vehicle. The first switch S1 is open while the second switch S2 is closed.

In the following describes some use cases illustrating use of the arrangement in accordance with the FIG. 2 embodiment.

In a seventh use case it is assumed that the vehicle is parked. The primary battery V1 is not used. The secondary battery V2 will supply electrical loads Z of the vehicle. The third source of electrical energy V3, or cycling battery, is not used and both the first switch S1 and the second switch S2 are open.

In an eight use case it is assumed that the vehicle is used in an accessory mode, where the combustion engine is not running. The primary battery V1 is not used. The secondary battery V2 will supply electrical loads Z of the vehicle. The third source of electrical energy V3, or cycling battery, is not used and the first S1 and second S2 switches are open.

In a ninth use case it is assumed that the vehicle is in use during combustion engine cranking. The primary battery V1 will supply the starter. The secondary battery V2 will supply electrical loads Z of the vehicle. The third source of electrical energy V3, or cycling battery, is not used and both the first switch S1 and the second switch S2 are open.

In a tenth use case it is assumed that the vehicle is in use in a driving mode with the combustion engine running. The primary battery V1 will be charged by the alternator A and provide redundancy supply for electrical loads Z of the vehicle and provide low voltage protection at high transient current consumption. The secondary battery V2 will supply electrical loads Z of the vehicle. The third source of electrical energy V3, or cycling battery, is being charged by the alternator A or the DC/DC converter, and further functions as redundancy supply for electrical loads Z of the vehicle and provide low voltage protection at high transient current consumption. The first switch S1 will be closed for a specified time period to charge the primary battery V1 or at transient support for loads, and the second switch S2 will be closed during vehicle retardation in order to charge free energy into the third source of electrical energy V3 when the alternator voltage is increased or at transients as support for electrical loads Z of the vehicle.

In an eleventh use case it is assumed that the vehicle is in use in a driving mode with the combustion engine in standby during a start/stop event. The primary battery V1 will provide redundancy supply for electrical loads Z of the vehicle. The secondary battery V2 will provide redundancy supply for electrical loads Z of the vehicle at high transient current consumption. The third source of electrical energy V3, or cycling battery, will provide primary supply for electrical loads Z of the vehicle, due to the fact that it may have a higher open circuit voltage than the primary battery V1, especially when the primary battery V1 is a lead-acid battery. The first switch S1 is open and the second switch S2 is closed.

In a twelfth use case it is assumed that the vehicle is in use in a driving mode with the combustion engine in standby during combustion engine cranking for warm start. The primary battery V1 will provide supply for the starter motor S. The secondary battery V2 will provide redundancy supply for electrical loads Z of the vehicle at high transient current consumption. The third source of electrical energy V3, or cycling battery, will provide primary supply for electrical loads Z of the vehicle, due to the fact that it may have a higher open circuit voltage than the primary battery V1, especially when the primary battery V1 is a lead-acid battery. The first switch S1 is open while the second switch S2 is closed.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. An arrangement for improving performance of an electrical system for a vehicle having an internal combustion engine provided with a start/stop system, the electrical system comprising a primary battery selectively connectable to an engine starter motor, and an alternator, a secondary battery, and an electrical load in parallel with one another, the alternator selectively connectable in parallel with the primary battery via a first switch, the arrangement comprising:
a third source of electrical energy having a higher open circuit voltage than the primary battery, wherein the third source of electrical energy is selectively connectable in parallel with the alternator and the electrical load via a second switch;
wherein, during a driving mode, the second switch is closed, the primary battery provides redundancy supply for the electrical load when the combustion engine is in standby during a start/stop event or the primary battery provides supply for the starter motor when the combustion engine is in standby during combustion engine cranking for warm start, the secondary battery provides redundancy supply for the electrical load at heightened transient current consumption, and the third source provides primary supply for the electrical load due to the third source having the higher open circuit voltage than the primary battery.

2. The arrangement of claim 1 further comprising a DC/DC converter in parallel with the alternator and arranged for selectively charging the third source of electrical energy via the second switch.

3. The arrangement of claim 1 wherein the third source of electrical energy is a super-capacitor.

4. The arrangement of claim 1 wherein the third source of electrical energy is a lithium-ion battery.

5. The arrangement of claim 1 further comprising a secondary battery in parallel with the alternator.

6. A method for improving performance of an electrical system of a vehicle having an internal combustion engine with a start/stop system, the electrical system comprising a primary battery selectively connectable to a starter motor for the internal combustion engine, and an alternator, a secondary battery, and a vehicle electrical load in parallel with each other, the alternator selectively connectable in parallel with the primary battery via a first switch, the method comprising:

arranging a third source of electrical energy having a higher open circuit voltage than the primary battery such that the third source of electrical energy is selectively connectable in parallel with the alternator and the electrical load via a second switch;

wherein, during a driving mode, the second switch is closed, the primary battery provides redundancy supply for the electrical load when the combustion engine is in standby during a start/stop event or the primary battery provides supply for the starter motor when the combustion engine is in standby during combustion engine cranking for warm start, the secondary battery provides redundancy supply for the electrical load at heightened transient current consumption, and the third source provides primary supply for the electrical load due to the third source having the higher open circuit voltage than the primary battery.

7. The method of claim 6 further comprising arranging a DC/DC converter in parallel with the alternator and to selectively charge the third source of electrical energy via the second switch.

8. The method of claim 6 wherein the third source of electrical energy is a super capacitor.

9. The method of claim 6 wherein the third source of electrical energy is a lithium-ion battery.

10. The method of claim 6 further comprising arranging a secondary battery in parallel with the alternator.

11. A vehicle comprising the arrangement of claim 1.

* * * * *